United States Patent
Lee

(10) Patent No.: US 9,979,194 B2
(45) Date of Patent: May 22, 2018

(54) POWER COMPENSATION APPARATUS AND METHOD OF CONTROLLING THE SAME

(71) Applicant: LSIS CO., LTD., Anyang-si, Gyeonggi-do (KR)

(72) Inventor: Eun Jae Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 15/684,808

(22) Filed: Aug. 23, 2017

(65) Prior Publication Data

US 2018/0083447 A1    Mar. 22, 2018

(30) Foreign Application Priority Data

Sep. 22, 2016  (KR) .................. 10-2016-0121773

(51) Int. Cl.
| | |
|---|---|
| *H02J 3/18* | (2006.01) |
| *H02J 3/20* | (2006.01) |
| *H02M 1/42* | (2007.01) |
| *G05F 1/70* | (2006.01) |

(52) U.S. Cl.
CPC .......... *H02J 3/1871* (2013.01); *H02J 3/1814* (2013.01); *H02J 3/1842* (2013.01); *H02J 3/1892* (2013.01); *H02J 3/20* (2013.01); *H02M 1/4208* (2013.01); *G05F 1/70* (2013.01)

(58) Field of Classification Search
USPC ...................................... 323/207; 363/89, 98
See application file for complete search history.

(56) References Cited

U.S. PATENT DOCUMENTS

| | | | |
|---|---|---|---|
| 5,329,222 A | 7/1994 | Gyugyi et al. | |
| 7,508,173 B2* | 3/2009 | Zhou .................... | H02J 3/1835 323/205 |
| 9,329,612 B2 | 5/2016 | Alatrash | |
| 2008/0157727 A1* | 7/2008 | Wong ..................... | G05F 1/70 323/207 |
| 2011/0071695 A1* | 3/2011 | Kouroussis .......... | H02J 3/1892 700/295 |

(Continued)

FOREIGN PATENT DOCUMENTS

| | | |
|---|---|---|
| JP | 2011199929 | 10/2011 |
| JP | 5820240 | 11/2015 |

(Continued)

OTHER PUBLICATIONS

Nielsen J. G., et al.; "Comparison of System Topologies for Dynamic Voltage Restorers"; IEEE; vol. 4; Sep. 30, 2001; pp. 2397-2403; (10 pages).

(Continued)

*Primary Examiner* — Jeffrey Sterrett
(74) *Attorney, Agent, or Firm* — K&L Gates LLP

(57) ABSTRACT

A power compensation apparatus compensates for power of a power system to be allowed to transmit from at least one or more power sources to a load. The power compensation apparatus includes a first system connected to the power system to compensate for active power and reactive power of the power system, a second system connected to the first system to store power necessary for compensating for active power and reactive power, and a third system connected to the second system to generate the power to be stored in the second system.

22 Claims, 9 Drawing Sheets

(56) References Cited

U.S. PATENT DOCUMENTS

2013/0181519 A1    7/2013  Lee
2014/0097809 A1    4/2014  Follic et al.
2016/0087522 A1*   3/2016  Matan .................... H02J 3/382
                                                         323/207
2017/0344046 A1*  11/2017  Choi ........................ G05F 1/70

FOREIGN PATENT DOCUMENTS

KR      20150006956          1/2015
WO       2009033506 A1       3/2009

OTHER PUBLICATIONS

European Search Report for related European Application No. 17177911.9; report dated Dec. 20, 2017; (10 pages).

* cited by examiner

POWER COMPENSATION APPARATUS AND METHOD OF CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2016-0121773, filed on Sep. 22, 2016, the contents of which are all hereby incorporated by reference herein in its entirety.

BACKGROUND

The present embodiment relates to a power compensation apparatus and a method of controlling the same.

With development of industry, large amounts of power have been required. A power generation complex having a power system needs to be developed according to demand for generating large amounts of power. Power consumption has increased in densely populated areas including metropolitan areas.

It is difficult to newly mount power transmission equipment for supplying power from a power generation complex to a power consumption area due to a NIMBY phenomenon or difficulty in security of sites where power transmission equipment is mounted. Therefore, the need for a flexible AC transmission system (FACTS) for improving power flow, system voltage and stability has arisen. A STATic synchronous COMpensator (STATCOM) which is a third-generation power compensator of a FACTS is connected to a power system in parallel to compensate for reactive power and active power necessary for the power system.

In a conventional STATCOM, as shown in FIG. 1, although a power system consistently requires active power, since power (energy) is not stored in a capacitor of the STATCOM, active power is not supplied to the power system. In other words, while the capacitor of the STATCOM is charged with power, active power cannot be supplied to the power system. That is, in the conventional STATCOM, it is impossible to charge the capacitor and, at the same time, to supply active power.

Accordingly, since the conventional STATCOM cannot consistently supply active power to the power system, the power system cannot stably operate.

SUMMARY

An object of the present embodiment is to solve the above-described problems and the other problems.

Another object of the present embodiment is to provide a power compensation apparatus capable of consistently supplying active power to stably transmit power to a power system, and a method of controlling the same.

According to a first aspect of the present embodiment, a power compensation apparatus compensates for power of a power system to be allowed to transmit from at least one or more power sources to a load. The power compensation apparatus includes a first system connected to the power system to compensate for active power and reactive power of the power system, a second system connected to the first system to store power necessary for compensating for active power and reactive power, and a third system connected to the second system to generate power to be stored in the second system. The first system includes a converter connected to the power system to convert power, a capacitor connected to the converter and charged with active power of the power system or the power of the second system, and a first controller configured to control the converter and the capacitor.

According to a second aspect of the present embodiment, a power compensation apparatus compensates for power of a power system for transmitting power generated by at least one or more power sources to a load. The power compensation apparatus includes a first system connected to the power system to compensate for active power and reactive power of the power system and to store power necessary for compensating for active power and reactive power; and a second system connected to the first system to generate power to be stored in the first system.

According to a third aspect of the present embodiment, a method of controlling a power compensation apparatus including a first system including a converter and a capacitor, a second system including a power storage apparatus and a third system including at least one or more renewable energy sources, in order to compensate for power of a power system at least one or more power at least one or more power sources to a load includes measuring, by the first system, a voltage and frequency of the power system, setting, by the first system, one of a reactive power supply mode, a reactive power absorption mode, an active power supply mode and an active power absorption mode based on the voltage and frequency, compensating, by the first system, for power according to the set mode, and storing, by the second system, power generated by the at least one or more renewable energy sources in the power storage apparatus.

DETAILED DESCRIPTION OF THE EMBODIMENTS

Figure 1:
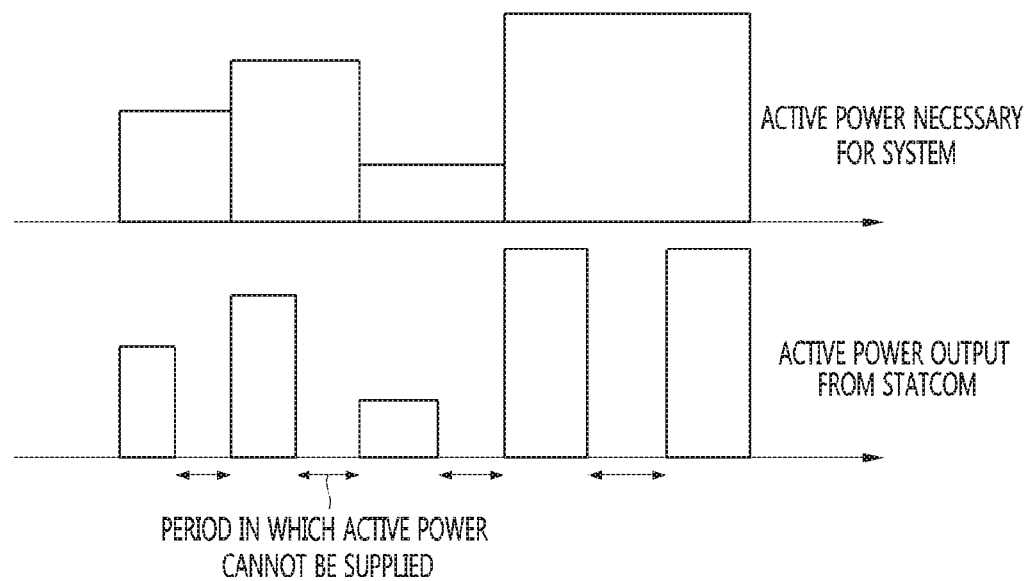
FIG. 1 is a diagram showing the state in which a conventional STATCOM cannot consistently supply active power.

Hereinafter, the embodiments of the present disclosure will be described in detail with reference to the accompanying drawings, in which the same or similar portions are denoted by the same reference numerals and repeated descriptions thereof will be omitted. The suffixes "module" and "unit" of elements herein are used for convenience of description and thus can be used interchangeably and do not have any distinguishable meanings or functions. In describing the present disclosure, a detailed description of known functions and configurations will be omitted when it may obscure the subject matter of the present embodiment. The accompanying drawings are used to help easily understand the technical idea of the present embodiment and it should be understood that the idea of the present disclosure is not limited by the accompanying drawings. The idea of the present disclosure should be construed to extend to any alterations, equivalents and substitutions besides the accompanying drawings.

Figure 2:
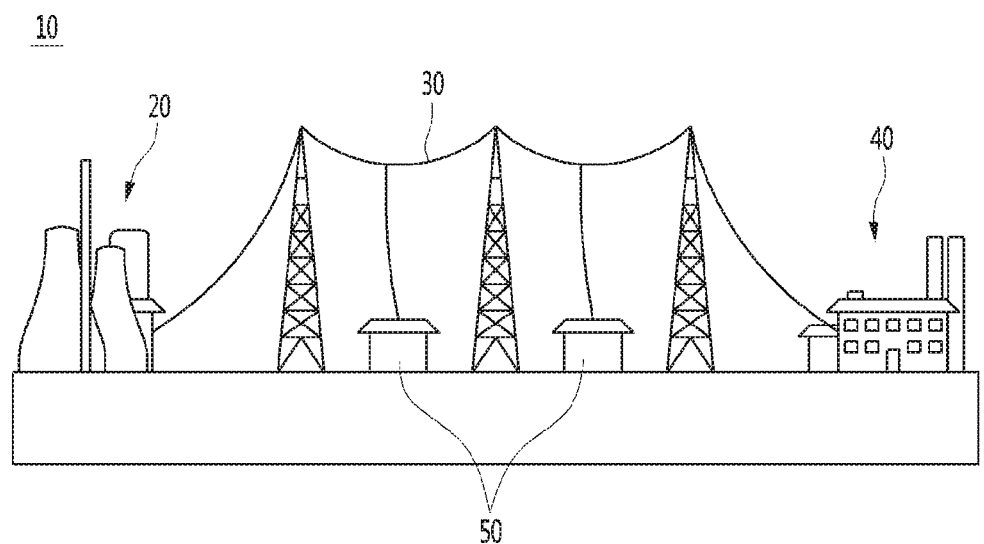
FIG. 2 is a diagram showing a power supply system according to an embodiment of the present disclosure.

FIG. 2 is a diagram showing a power supply system according to an embodiment of the present embodiment.

Referring to FIG. 2, the power supply system 10 according to an embodiment may include a power source 20, power systems 30, a load 40 and a plurality of power compensation apparatuses 50.

The power source 20 may include at least one power source units.

The power source 20 refers to a place or apparatus, in which power is generated, and may be understood as a generator for generating power.

The power source 20 may include, for example, a hydroelectric power plant, a thermoelectric power plant, a nuclear power plant, a generator, a power storage apparatus, etc. The power storage apparatus may include an energy storage system (EES), a battery, a primary battery, a secondary battery, a solar cell, a supercapacitor, a fuel cell, a storage battery, a fly wheel, etc.

The power source 20 may include a renewable energy source such as a wind power plant, a solar cell plant or a hydrogen power plant.

Various power storage apparatuses which are currently being developed or are not known yet may be used as the power storage apparatus of the present disclosure.

The power systems 30 may mean all apparatuses including a power line for transmitting power generated by the power source 20 to the load 40, a steel tower, an arrester and an insulator.

The power system may have a voltage of at least one of 345 KV, 154 K and 22.9 KV.

The load 40 means a place or apparatus, in which power generated by the power source 20 is consumed, may be understood as a consumer for consuming power.

The load 40 may include at least one or more loads.

The load 40 may include factories consuming large amounts of power, such as steel mills, car factories, display factories and semiconductor factories.

The load 40 may include convention centers, department stores, big shopping centers, sports facilities, theaters, office buildings, government branches, large buildings, large-scale residential facilities, etc.

Various buildings or facilities consuming power may be included in the load 40 of the present embodiment.

The power compensation apparatus 50 may be connected to the power system to compensate for reactive power and/or active power according to supply and/or lack of active power and/or reactive power applied to the power system 30.

The power compensation apparatus 50 may be a STATCOM without being limited thereto.

The power compensation apparatus 50 may be connected to the power system in parallel without being limited thereto.

The power compensation apparatus 50 may be mounted at each power system, for example. The power compensation apparatus 50 may be mounted at or near the load 40. The distances between the power systems 30 may be equal or different.

The power compensation apparatus 50 may be mounted on an available site to increase availability of the available site.

The power compensation apparatus 50 of the present embodiment may be mounted at the power system 30 or the load 40 to exchange, that is, absorb and/or supply reactive power or active power, thereby stably transmitting power.

Figure 3:
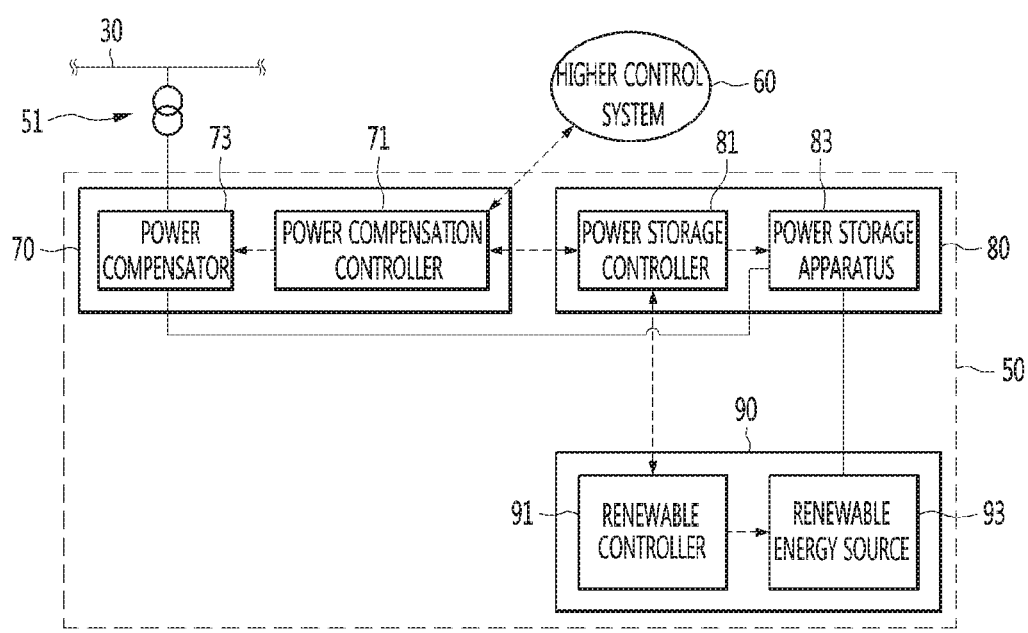
FIG. 3 is a block diagram showing a power compensation apparatus according to a first embodiment of the present disclosure.

FIG. 3 is a block diagram showing a power compensation apparatus according to a first embodiment of the present disclosure.

The power compensation apparatus according to the first embodiment of the present disclosure may be the power compensation apparatus 50 of FIG. 2 without being limited thereto.

Referring to FIG. 3, the power compensation apparatus 50 according to the first embodiment of the present disclosure may include a power compensation system 70, a power storage system 80 and a renewable system 90.

The power compensation system 70 may perform data communication with a higher control system 60. Therefore, the power compensation system 70 and the higher control system 60 may exchange information.

The higher control system 60 may or may not be included in the power compensation apparatus 50. The power compensation system 70 and the power storage system 80 may perform data communication and the power storage system 80 and the renewable system 90 may perform data communication.

The higher control system 60 may be responsible for managing and/or controlling the power compensation apparatus 50 of the present embodiment.

The higher control system 60 may be an energy management system (EMS) or supervisory control and data acquisition (SCADA) system without being limited thereto.

For example, the higher control system 60 may deliver an instruction or command (may be referred to as a control signal) to a lower control system such that the lower system performs control according to the instruction or command.

For example, the higher control system 60 may perform analysis and make a determination based on a variety of information provided by the lower control system 60 to deliver an instruction or command to the lower control system or to manage and/or control the power system 30 according to the result of analysis or determination.

The lower control system may include at least one of the power compensation system 70, the power storage system 80 and the renewable system 90, for example.

The power compensation system 70 may compensate for the active power and/or reactive power of the power system 30.

The power compensation system 70 may compensate for active power and/or reactive power in response to the instruction or command received from the higher control system 60. This may be referred to as a manual operation mode.

The power compensation system 70 may check the state of the power system 30 regardless of the instruction of the higher control system 60 and autonomously compensate for active power and/or reactive power, without being limited thereto. This may be referred to as an automatic operation mode.

The power compensation system 70 may be set to one of the manual operation mode and the automatic operation mode under control of an operator or a higher control system 60.

The power compensation system 70 may exchange data with the higher control system 60 or the power storage system 80.

For example, the power compensation system 70 may report specific information or data to the higher control system 60. Such information or data will be described below in detail.

For example, the power compensation system 70 may control the power storage system 80. That is, the power compensation system 70 may deliver a control signal or data to the power storage system 80, and the power storage system 80 may store power in response to the control signal or data received from the power compensation system 70 or transmit power stored in the power storage system 80 to the power compensator 73.

The power storage system 80 may perform data communication with the renewable system 90.

The power storage system 80 may control the renewable system 90. For example, the power storage system 80 may transmit a control signal related to power transmission to the renewable system 90 and the renewable system 90 may operate a renewable energy source 93 in response to the control signal to generate power and transmit the generated power to the power storage system 80. The transmitted power may be stored in the power storage system 80.

Hereinafter, the systems 70, 80 and 90 will be described in greater detail.

The power compensation system 70, the power storage system 80 and the renewable system 90 may be respectively referred to as first to third systems, without being limited thereto.

The power compensation system 70 may include a power compensation controller 71 and a power compensator 73.

The power compensation controller 71 may perform data communication with the higher control system 60 or the power storage system 80.

The power compensation controller 71 may control the power compensator 73.

If the automatic operation mode is set, the power compensation controller 71 may autonomously control the power compensator 73, without control of the higher control system 60 to compensate for active power and/or reactive power.

If the manual operation mode is set, the power compensation controller 71 may control the power compensator 73 under control of the higher control system 60 to compensate for active power and/or reactive power.

The automatic operation mode and the manual operation mode of the power compensation system 70 may be set by an operator who operates the power compensation system 70.

Alternatively, the automatic operation mode and the manual operation mode of the power compensation system 70 may be set by an operator who operates the higher control system 60. That is, when the operator inputs, to the higher control system 60, an input signal for setting the power compensation system 70 to the automatic operation mode or the manual operation mode, the higher control system 60 may deliver a control signal related to the operation mode to the power compensation system 70 based on the input signal and the power compensation system 70 may be set to the operation mode according to the control signal delivered from the higher control system 60.

Figure 4:
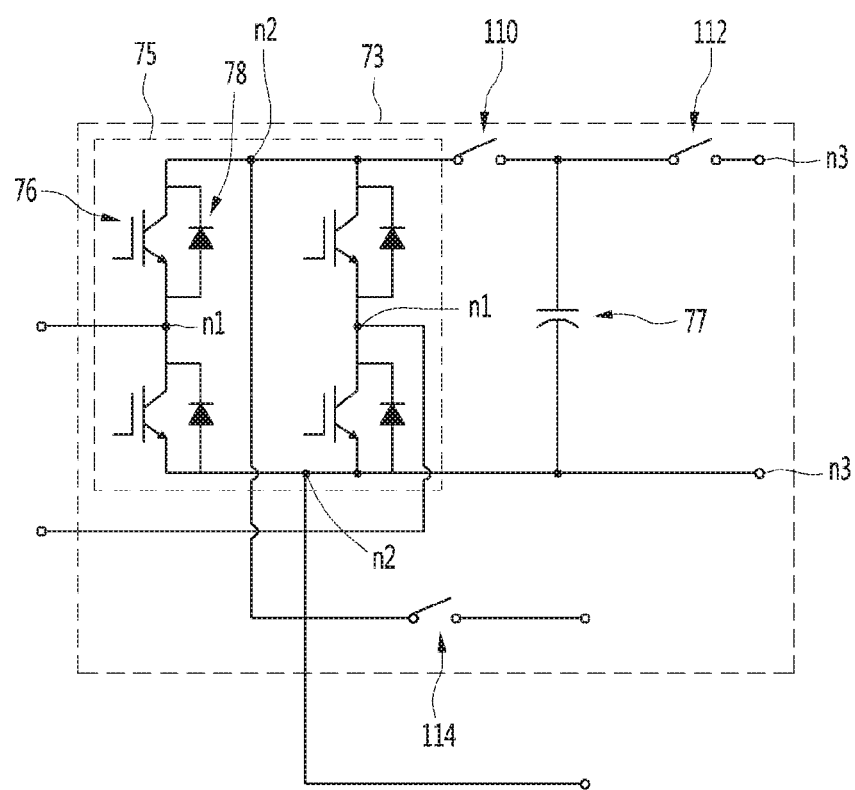
FIG. 4 is a circuit diagram showing a power compensation apparatus in detail.

The power compensator 73 may include a converter 75, a capacitor 77 and first to third switch elements 110, 112 and 114, as shown in FIG. 4.

The converter 75 may include a plurality of switch elements 76. For example, the converter 75 may include four switch elements 76. Two switch elements may be connected in series and the two switch elements connected in series may be connected in parallel to form a pair. In addition, a diode 78 may be connected to each switch element 76 in parallel. The configuration of the converter 75 will be described below in detail.

In FIG. 4, a first node n1 between the switch elements 76 connected in series in the converter 75 may be connected to the power system 30 of FIG. 3 through a transformer and a current transformer 51. In addition, a second node n2 between the switch elements 76 connected in parallel in the converter 75 may be connected to the power storage system 80 of FIG. 3. In addition, a third node n3 connected to a capacitor 77 and a second switch element 112 may be connected to the power storage system 80 of FIG. 3.

The converter 75 may be a modular multi-level converter (MMC) without being limited thereto. In the MMC, a plurality of converters 75 shown in FIG. 4 is provided per phase and may be connected to each other in series. Three-phase MMCs may be divided into star connection topology and delta connection topology according to connection type thereof. The star connection topology and the delta connection topology are known well and thus a description thereof will be omitted.

The converter 75 of the present embodiment may be a bidirectional power conversion apparatus for converting power of a DC voltage into power of an AC voltage or converting power of an AC voltage into power of a DC voltage without being limited thereto.

For example, the converter 75 may convert active power of an AC voltage received from the power system 30 into active power of a DC voltage and charge the capacitor 77 with the active power of the DC voltage.

For example, the converter 75 may convert active power of the DC voltage stored in the capacitor 77 into active power of an AC voltage and then supply the active power of the AC voltage to the power system 30.

The converter 75 of the present embodiment may have a full bridge circuit including a plurality of switch elements 76 and a plurality of diodes 78 without being limited thereto.

The switch elements 76 may be insulated gate bipolar transistor (IGBT) switches without being limited thereto.

The diode 78 may be connected across each switch element 76.

The active power and/or reactive power may be compensated for by switching of the plurality of switch elements 76 included in the converter 75.

For example, if reactive power of the power system 30 is insufficient, the plurality of switch elements 76 may be switched such that the phase of a voltage is synchronized with the phase of current. The reactive power of the power system 30 may be compensated for by switching of the plurality of switch elements 76.

For example, if reactive power of the power system 30 is excessive, the plurality of switch elements 76 may be switched such that the phase of current is synchronized with the phase of a voltage. The reactive power of the power system 30 may be absorbed or consumed by switching of the plurality of switch elements 76.

Insufficiency or excess of reactive power may be determined based on a voltage value. At this time, the voltage value may be set as a determination criterion. Insufficiency or excess of reactive power may be determined based on the set voltage value.

For example, if active power of the power system 30 is insufficient, the plurality of switch elements 76 may be switched such that power stored in the capacitor 77 or the power storage apparatus 83 is supplied to the power system 30. For example, if active power of the power system 30 is excessive, the plurality of switch elements 76 may be switched such that the capacitor 77 or the power storage apparatus 83 is charged with the active power of the power system 30.

Insufficiency or excess of active power may be determined based on a frequency value. At this time, the frequency value may be set as a determination criterion. For example, a commercial frequency of 60 Hz may be used for transmission and distribution of the power system 30. Accordingly, 60 Hz may be set as a frequency value for determining insufficiency or excess of active power, without being limited thereto.

The capacitor 77 may be charged or discharged. For example, the capacitor 77 may be charged with power received from the power system 30 or the power storage apparatus 83. For example, the capacitor 77 may output the charged power to the power system 30 to be discharged.

The first to third switch elements 110, 112 and 114 may be switches for performing control to supply or absorb active power or reactive power.

Each of the first to third switch elements 110, 112 and 114 may include at least one or more switches connected in series. The number of switches may be changed according to the strength of power, without being limited thereto. For example, the first switch element 110 may include at least one or more switches.

One end of the first switch element 110 may be connected to the converter 75 and the other end of the first switch element 110 may be connected to the capacitor 77 and the second switch element 112.

One end of the second switch element 112 may be connected to the capacitor 77 and the first switch element 110 and the other end of the second switch element 112 may be connected to one end of the power storage apparatus 83 of the power storage system 80.

One end of the third switch element 114 may be connected to the converter 75 and the other end of the third switch element 114 may be connected to the other end of the power storage apparatus 83 of the power storage system 80.

Each of the first to third switch elements 110, 112 and 114 may be controlled by the power compensation controller 71.

In response to one control signal received from the power compensation controller 71, the first and second switch elements 110 and 112 and the third switch element 114 may operate reversely. To this end, the first and second switch elements 110 and 112 and the third switch element 114 may be power semiconductor switch elements having opposite polarities. For example, the first and second switch elements 110 and 112 may be p-type power semiconductor switch elements and the third switch element 114 may be an n-type power semiconductor switch element.

In response to the first and second control signals received from the power compensation controller 71 having different levels, the first and second switch elements 110 and 112 and the third switch element 114 may operate reversely. The first to third switch elements 110, 112 and 114 may be power semiconductor switch elements having the same polarity. In this case, the first and second switch elements 110 and 112 may be turned on in response to a first control signal and the third switch element 114 may be turned off in response to a second control signal.

The present embodiment may include five operation modes including an initial charging mode, a reactive power absorption mode, a reactive power supply mode, an active power absorption mode and an active power supply mode without being limited thereto.

The five operation modes may be determined by the power compensation controller 71 based on the result of checking the state of the power system 30.

The operation modes will be described below in detail.

Referring to FIG. 3 again, the power storage system 80 may include the power storage controller 81 and the power storage apparatus 83.

The power storage controller 81 may perform data communication with the power compensation controller 71 or the renewable system 90. The power storage controller 81 may operate under control of the power compensation controller 71.

The power storage controller 81 may perform control to charge the capacitor 77 of the power compensator 73 with the power of the power storage apparatus 83, when a charging request is received from the power compensation controller 71.

The power storage controller 81 may perform control to request to utilize the power stored in the power storage apparatus 83 as active power to the power compensation controller 71. The power storage controller 81 may charge the capacitor 77 of the power compensator 73 with the power stored in the power storage apparatus 83 as active power to supply power to the power system 30 or directly supply power to the power system 30 when a request for supplying active power is received from the power compensation controller 71.

The power storage controller 81 may request to generate power to be stored in the power storage apparatus 83 from the renewable system 90 and store the power generated by the renewable system 90 in the power storage apparatus 83. If the power generated by the renewable system 90 is power of an AC voltage, the power storage controller 81 may perform control to convert power of the AC voltage into power of a DC voltage and to store the power of the DC voltage in the power storage apparatus 83.

The power storage controller 81 may be, for example, a battery management system (BMS) without being limited thereto.

The power storage apparatus 83 may include an energy storage system (ESS), a battery, a primary battery, a secondary battery, a solar cell, a supercapacitor, a fuel cell, a storage battery, a fly wheel, etc.

The renewable system 90 may include a renewable controller 91 and a renewable energy source 93.

The renewable controller 91 may perform data communication with the power storage controller 81.

The renewable controller 91 may receive a request for supplying power from the power storage controller 81. The renewable controller 91 may operate the renewable energy source 93 in response to the request and transmit the power generated by the renewable energy source 93 to the power storage system 80.

The renewable energy source 93 means a place or apparatus in which power is generated, and may be understood as a generator for generating power.

The renewable energy source 93 may include at least one or more new and renewable energy sources.

The renewable energy source 93 may include, for example, a wind power plant, a solar cell plant and a hydrogen power plant without being limited thereto.

The power compensation controller 71, the power storage controller 81 and the renewable controller 91 may be referred to as first to third controllers, respectively.

Although the power compensation system 70 and the power storage system 80 are separately described in the above description, the power compensation system 70 and the power storage system 80 may be combined.

Figure 5:
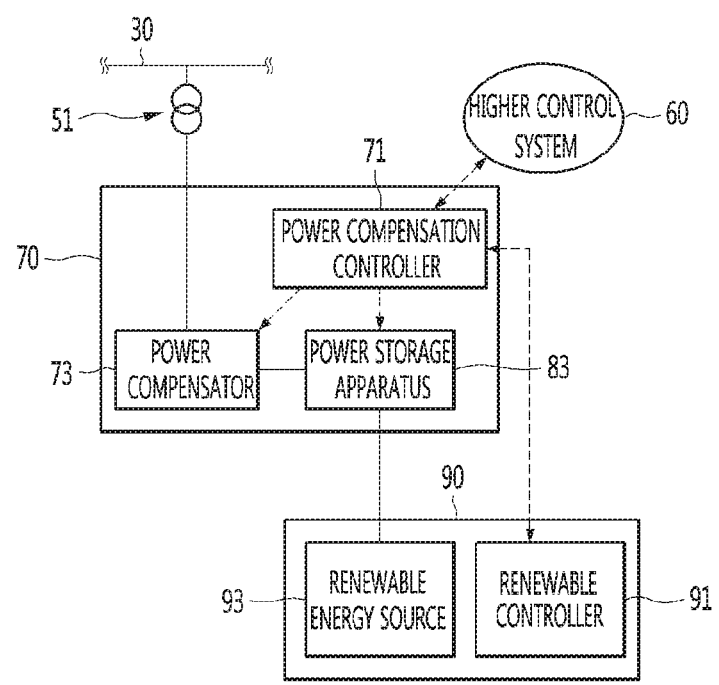
FIG. 5 is a block diagram showing a power compensation apparatus according to a second embodiment of the present disclosure.

FIG. 5 is a block diagram showing a power compensation apparatus according to a second embodiment of the present disclosure.

In the power compensation apparatus according to the second embodiment of the present disclosure, the power compensation system 70 and the power storage system 80 of the power compensation apparatus according to the first embodiment (FIG. 3) of the present disclosure are combined. For example, the power storage controller 81 of the power storage system 80 of the first embodiment of the present disclosure may be omitted and the control functions of the power storage controller 81 may be performed by the power compensation controller 71.

The power storage apparatus 83 of the second embodiment of the present disclosure may be included in the power compensation system 70. Therefore, in the second embodiment of the present disclosure, the power compensation controller 71 may control not only the power compensator 73 but also the power storage apparatus 83. In addition, the power compensation controller 71 may directly perform data communication with the renewable controller 91 of the renewable system 90. Accordingly, the power compensation controller 71 may directly control the renewable system 90 to control power generation of the renewable system 90.

The functions of the components are described in detail in the first embodiment of the present disclosure and thus a repeated description thereof will be omitted.

Figure 6:
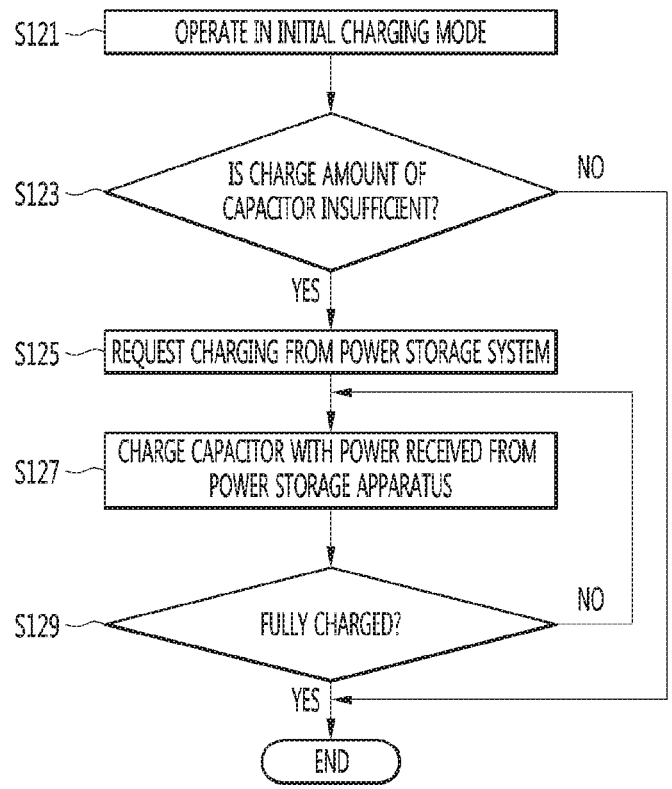
FIG. 6 is a flowchart illustrating a method of controlling a power compensation apparatus in an initial charging mode according to an embodiment of the present disclosure.

FIG. 6 is a flowchart illustrating a method of controlling a power compensation apparatus in an initial charging mode according to an embodiment of the present disclosure.

The power compensation system 70 may be set to automatically operate in an initial charging mode upon initial startup.

Accordingly, the power compensation system 70 may initially operate in the initial charging mode.

Referring to FIG. 6, as described above, the power compensation system 70 may operate in the initial charging mode upon initial startup (S121).

For operation in the initial charging mode, the first and second switch elements 110 and 112 may be turned on and the third switch element 114 may be turned off.

The power compensation controller 71 may check the charge amount of the capacitor 77 to determine whether the charge amount of the capacitor 77 is insufficient (S123). The charge amount of the capacitor 77 may be checked by detecting the voltage of the capacitor 77, without being limited thereto.

If the charge amount of capacitor 77 is insufficient, the power compensation controller 71 may transmit a charge request signal to the power storage system 80 (S125).

The power storage controller 81 of the power storage system 80 may receive the charge request signal and check the charge state of the power storage apparatus 83 in response to the charge request signal.

If the charge amount of the power storage apparatus 83 is equal to or greater than a threshold value, the power storage controller 81 may transmit the power of the power storage apparatus 83 to the power compensator 73 of the power compensation system 70. The capacitor 77 of the power compensator 73 may be charged with the transmitted power (S127).

The power compensation controller 71 may continuously check the charge state of the capacitor 77 to determine whether the capacitor 77 is fully charged (S129). The capacitor being fully charged may mean that the capacitor 77 is charged to the maximum capacity thereof, without being limited thereto.

When the capacitor 77 is fully charged, the power compensation controller 71 may change the second switch element 112 from the ON state to the OFF state and maintain the first and third switch elements 110 and 114 without change. That is, the first switch element 110 may be maintained in the ON state and the third switch element 114 may be maintained in the OFF state.

When the capacitor 77 is fully charged, the power storage system 80 may transmit an initial charge completion signal to the power compensation system 70.

When the capacitor 77 is fully charged, operation of the power compensation system 70 in the initial charging mode may be finished.

Figure 7:
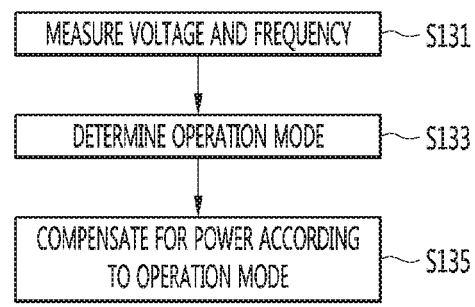
FIG. 7 is a flowchart illustrating a method of compensating for power in a power compensation apparatus based on a mode according to an embodiment of the present disclosure.

FIG. 7 is a flowchart illustrating a method of compensating for power in a power compensation apparatus based on a mode according to an embodiment of the present disclosure.

Referring to FIG. 7, the power compensation system 70 may measure voltage and frequency of the power system 30 (S131). To this end, a potential transformer and a current transformer 51 may be provided between the power system 30 and the power compensation apparatus 50.

Current of the power system 30 may be detected by the current transformer and the voltage of the power system 30 may be detected by the transformer.

The voltage of the power system 30 may be measured by performing digital signal processing with respect to the detected voltage.

In addition, the frequency of the power system 30 may be measured based on phase obtained from the detected voltage and current.

The frequency of the power system 30 may be 60 Hz as a commercial frequency used in the power system 30 without measurement, without being limited thereto.

The power compensation system 70 may determine an operation mode based on the voltage or frequency of the power system 30.

The power compensation system 70 may determine a reactive power supply mode or a reactive power absorption mode based on the voltage (S133). In addition, an active power supply mode or an active power absorption mode may be determined based on the frequency.

The power compensation system 70 may compensate for the active power or the reactive power according to the determined operation mode (S135).

Hereinafter, a power compensation method according to operation mode will be described in detail.

<Reactive Power Supply Mode and Reactive Power Absorption Mode>

If the reactive power supply mode or the reactive power absorption mode is determined in S133 of FIG. 7, the power compensation controller 71 may turn the first and second switch elements 110 and 112 on and turn the third switch element 114 off.

At this time, the capacitor 77 has been charged with power received from the power storage apparatus 83 in the initial charging mode.

For example, if the voltage of the power system 30 measured in S131 of FIG. 7 is less than a reference value or a set value, the power compensation controller 71 may determine the reactive power supply mode and switch the plurality of switch elements 76 of the power compensator 73 to synchronize the phase of the voltage with the phase of the current. By switching the switch elements 76, the reactive power may be supplied to the power system 30 or may be compensated for.

For example, if the voltage of the power system 30 measured in S131 of FIG. 7 is greater than the reference value or the set value, the power compensation controller 71 may determine the reactive power absorption mode and switch the plurality of switch elements 76 of the power compensator 73 to synchronize the phase of current with the phase of the voltage. By switching the switch elements 76, reactive power of the power system 30 may be absorbed or consumed.

The plurality of switch elements 76 of the power compensator 73 may be controlled by the power compensation controller 71.

<Active Power Supply Mode>

Figure 8:
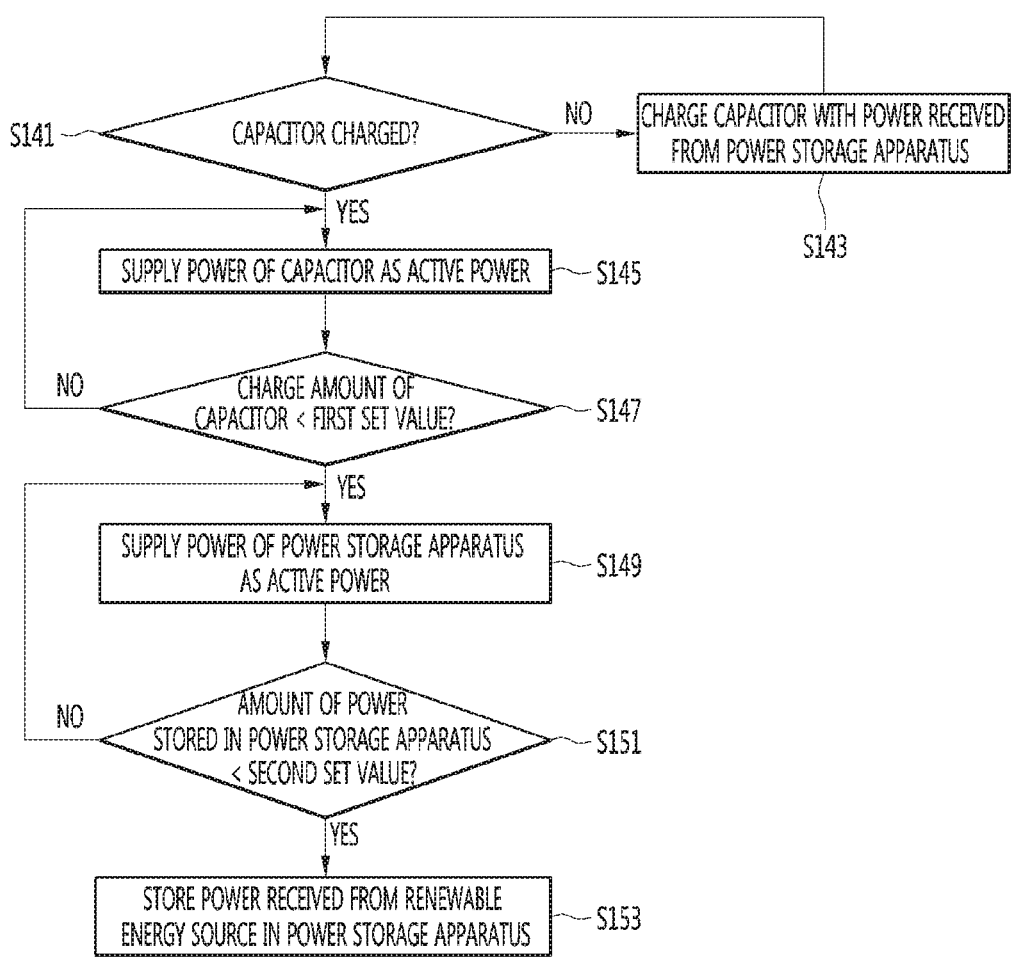
FIG. 8 is a flowchart illustrating a control method in an active power supply mode according to an embodiment of the present disclosure.

FIG. 8 is a flowchart illustrating a control method in an active power supply mode according to an embodiment of the present disclosure.

In operation in the active power supply mode, the power stored in the capacitor 77 of the power compensation system 70 or the power stored in the power storage apparatus 83 of the power storage system 80 may be supplied to the power system 30 as active power. For example, the power stored in the capacitor 77 may be first supplied to the power system 30 as active power, and, when the charge amount of the capacitor 77 becomes insufficient, the power stored in the power storage apparatus 83 may be supplied to the power system 30 as active power.

In order to supply active power to the power system 30, the power compensation controller 71 of the power compensation system 70 may control the first and third switch elements 110 and 114 to turn the first switch element 110 on and to turn the third switch element 114 off. The second switch element 112 may be turned on or off such that power of the power storage apparatus 83 of the power storage system 80 is no longer supplied to the capacitor 77. If the capacitor 77 is fully charged, the second switch element 112 may be turned off. If the charge amount of the capacitor 77 is insufficient, the second switch element 112 may be turned on to charge the capacitor 77 with power received from the power storage apparatus 83 of the power storage system 80.

The power compensation controller 71 of the power compensation system 70 may notify the higher control system 60 that active power may be supplied, if the capacitor 77 or the power storage apparatus 83 is charged with power. The higher control system 60 may control or adjust the active power generated and supplied by at least one or more power sources 20 connected to the power system 30 such that the power compensation apparatus 50 of the present embodiment compensates for the active power, if the active power of the power system 30 is insufficient. Thereafter, the higher control system 60 may deliver a command for approving supply of active power to the power compensation system 70 and the power compensation system 70 may supply the power stored in the capacitor 77 or the power compensation apparatus 50 to the power system 30 as active power according to the command if the active power of the power system 30 is insufficient.

Referring to FIG. 8, the power compensation controller 71 may check whether the capacitor 77 is charged (S141).

Whether the capacitor 77 is charged may be determined based on the charge amount of the capacitor 77 or the voltage of the capacitor 77, without being limited thereto.

If the capacitor 77 is not charged, that is, if the charge amount of the capacitor 77 is insufficient, the power compensation controller 71 may perform control to turn the second switch element 112 on, to request supply of power from the power storage controller 81 of the power storage system 80 and to charge the capacitor 77 with power received from the power storage apparatus 83 under control of the power storage controller 81 (S143).

If the capacitor 77 is charged, the power compensation controller 71 may control the capacitor 77 to supply the power of the capacitor 77 to the power system 30 as active power (S145). At this time, the plurality of switch elements 76 of the converter 75 may be switched. For example, if the capacitor 77 is charged with power of a DC voltage, the power of the DC voltage may be converted into power of an AC voltage by switching of the switch elements 76 of the converter 75 and the power of the AC voltage may then be supplied to the power system 30 as active power.

For example, the power compensation controller 71 may control the capacitor 77 to supply the power of the capacitor 77 to the power system 30 as active power, if the measured frequency of the power system 30 becomes less than a predetermined frequency, e.g., a commercial frequency of 60 Hz.

As the power of the capacitor 77 is supplied to the power system 30 as active power, the capacitor 77 is discharged such that the charge amount of the capacitor 77 decreases.

The power compensation controller 71 may determine whether the charge amount of the capacitor 77 or the voltage of the capacitor 77 is less than a first set value (S147).

The first set value is predetermined and may be, for example, set to 10% to 40% of the maximum charge amount of the capacitor 77, without being limited thereto.

If the charge amount of the capacitor 77 is less than the first set value, the power compensation controller 71 may determine that the charge amount of the capacitor 77 is insufficient.

If the charge amount of the capacitor 77 is greater than the first set value, the power compensation controller 71 may determine that the power of the capacitor 77 may be used as active power to be supplied to the power system 30 more and yet more.

If the charge amount of the capacitor 77 is less than the first set value, the power compensation controller 71 may control the first to third switch elements 110, 112 and 114 to turn the first and second switch elements 110 and 112 off and to turn the third switch element 114 on. In this case, the power stored in the power storage apparatus 83 may be directly transmitted to the converter 75. Thus, by switching of the plurality of IGBT switches of the converter 75, power of the DC voltage received from the power storage apparatus 83 may be converted into active power of an AC voltage and then supplied to the power system 30 (S149).

The power stored in the power storage apparatus 83 may be transmitted to the converter 75 of the power compensation system 70 to discharge the power storage apparatus 83, thereby reducing the charge amount or storage amount of the power storage apparatus 83.

The power storage controller 81 of the power storage system 80 may determine whether the charge amount of the power storage apparatus 83 is less than a second set value (S151).

The second set value is predetermined and may be, for example, set to 10% to 40% of the maximum charge amount of the power storage apparatus 83, without being limited thereto.

If the charge amount of the power storage apparatus 83 is less than the second set value, the power storage controller 81 may determine that the charge amount of the power storage apparatus 83 is insufficient.

If the charge amount of the power storage apparatus 83 is greater than the second set value, the power storage controller 81 may determine that the power of the power storage apparatus 83 can be supplied to the converter 75 of the power compensation system 70 more and yet more.

If the charge amount of the power storage apparatus 83 is less than the second set value, the power storage controller 81 may determine that the power of the power storage apparatus 83 cannot be supplied to the converter 75 and turn the third switch element 114 off such that power of the power storage apparatus 83 is no longer supplied to the converter 75. At this time, the first and second switches which are in the OFF state may be maintained in the OFF state or turned on, without being limited thereto.

Thereafter, the power storage controller 81 may control the renewable system 90 to store power transmitted from the renewable system 90 in the power storage apparatus 83 (S153).

More specifically, if the charge amount of the power storage apparatus 83 is less than the second set value, the power storage controller 81 may request supply of power from the renewable system 90.

The renewable controller 91 of the renewable system 90 may operate at least one or more renewable energy sources 93 in response to the request for supplying power from the power storage controller 81, thereby generating power.

The renewable controller 91 may transmit power generated by the renewable energy source 93 to the power storage system 80. The power storage controller 81 may control the power storage apparatus 83 to store power received from the new and renewable energy source 93 in the power storage apparatus 83.

While the power received from the renewable energy source 93 is stored in the power storage apparatus 83, if active power from the power compensation apparatus 50 of the present embodiment should be continuously supplied to the power system 30, the power compensation controller 71 may turn the first and second switches on and supply the active power to the power system 30 by the charge amount of 10% to 40% of the capacitor 77, without being limited thereto.

If the power received from the renewable energy source 93 is completely stored in the power storage apparatus 83, the first and second switches may be turned on to transmit the power of the power storage apparatus 83 to the power compensation system 70, thereby charging the capacitor 77. After the capacitor 77 is charged with the power of the power storage apparatus 83, the active power of the AC voltage may be supplied to the power system 30 through the power conversion process of the converter 75.

As another example, if the power received from the renewable energy source 93 is completely stored in the power storage apparatus 83, the third switch may be turned on to directly transmit the power of the power storage apparatus 83 to the converter 75 of the power compensation system 70, thereby supplying the active power of the AC voltage to the power system 30 through the power conversion process of the converter 75.

Figure 10:
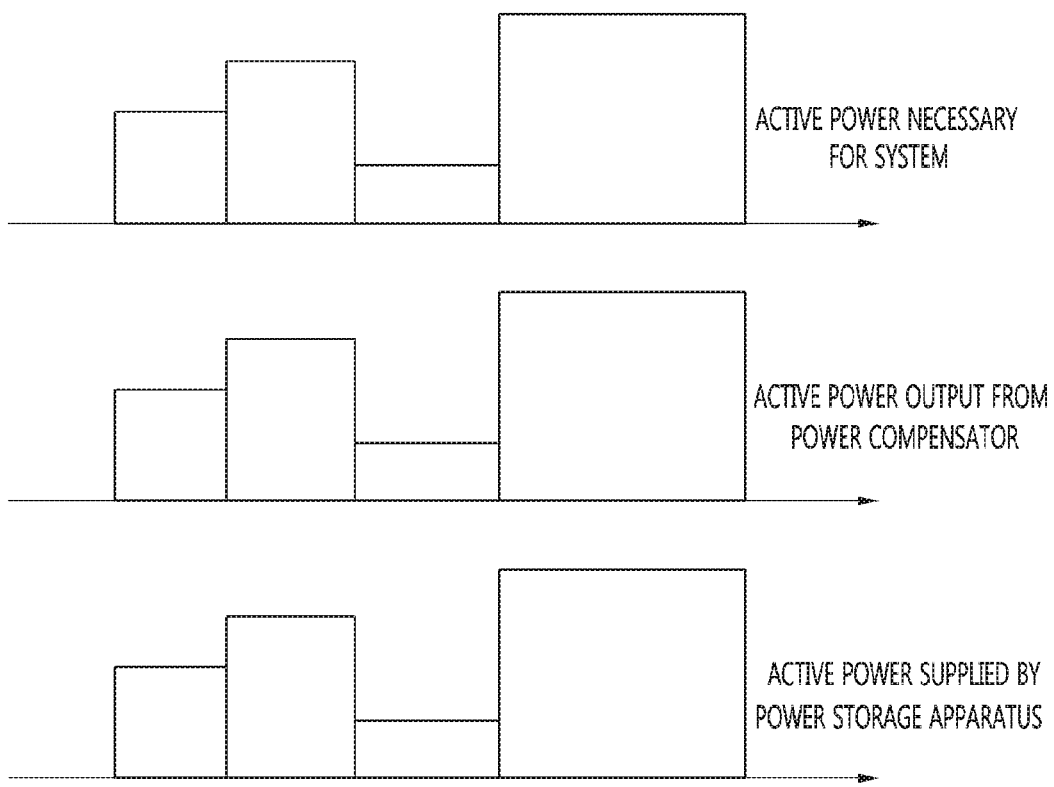
FIG. 10 is a diagram showing a state in which a power compensation apparatus according to an embodiment of the present disclosure consistently supplies active power.

According to the present embodiment, the active power may be supplied to the power system 30 using the power stored in the capacitor 77 of the power compensation system 70, and, when the power stored in the capacitor 77 can no longer be supplied to the power system 30, the power stored in the power storage apparatus 83 of the power storage system 80 may be directly supplied to the power system 30 to continuously supply active power to the power system 30 as shown in FIG. 10, thereby stably supplying power to the power system 30 anytime.

<Active Power Absorption Mode>

Figure 9:
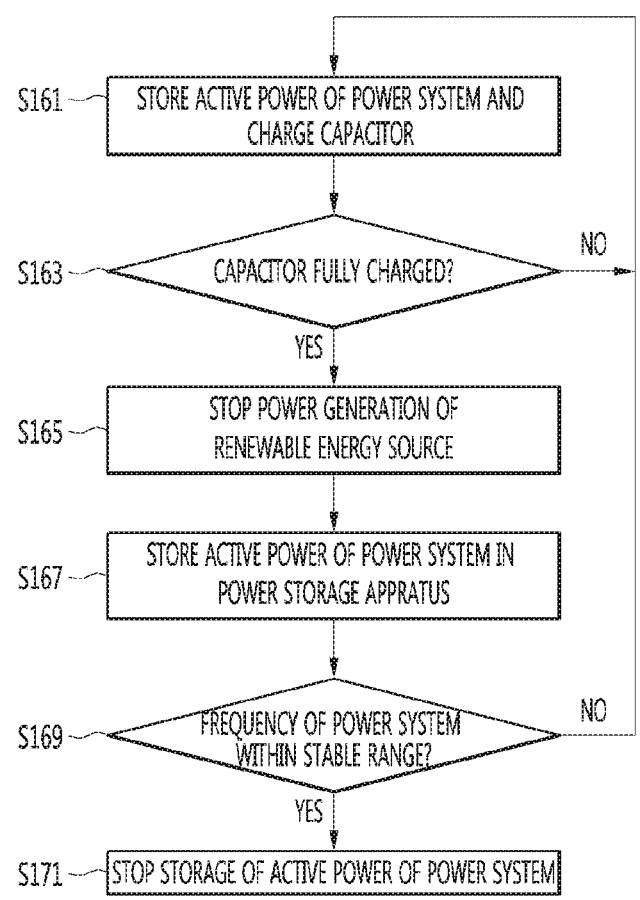
FIG. 9 is a flowchart illustrating a control method in an active power absorption mode according to an embodiment of the present disclosure.

FIG. 9 is a flowchart illustrating a control method in an active power absorption mode according to an embodiment of the present disclosure.

In the active power absorption mode, the capacitor 77 of the power compensation system 70 or the power storage apparatus 83 of the power storage system 80 may be charged with the active power of the power system 30. For example, the capacitor 77 of the power compensation system 70 may be first charged with the active power of the power system 30 and, when the capacitor 77 is fully charged, the active power of the power system 30 may be stored in the power storage apparatus 83 of the power storage system 80.

In the active power absorption mode, the power compensation controller 71 may control the first to third switch elements 110, 112 and 114 to turn the first and second switches on and turn the third switch off.

Referring to FIG. 9, the power compensation controller 71 may determine that the amount of active power in the power system is excessive if the measured frequency of the power system 30 is greater than a set frequency, e.g., a commercial frequency of 60 Hz.

The power compensation controller 71 may charge the capacitor 77 of the power compensator 73 with the active power of the power system 30 based on the result of determination (S161).

More specifically, upon determining that the amount of active power in the power system 30 is excessive, the power compensation controller 71 may control the converter 75 to convert the active power of the AC voltage of the power system 30 into active power of a DC voltage and then charge the capacitor 77 with the active power of the DC voltage.

If the capacitor 77 is fully charged with the active power of the power system 30 (S163), the power compensation controller 71 may control the first to third switch elements 110, 112 and 114 to turn the first and second switches off and to turn the third switch on.

Therefore, the active power of the power system 30 may be transmitted to the power storage system 80 through the converter 75 of the power compensator 73.

If active power is transmitted from the power compensation system 70, the power storage controller 81 of the power storage system 80 may control the power storage apparatus 83 to store the transmitted active power in the power storage apparatus 83 (S167).

The power storage controller 81 may check whether the power is transmitted from the renewable system 90 before storing the active power received from the power compensation system 70 in the power storage apparatus 83.

If active power is received from the power compensation system 70, power does not need to be received from the renewable system 90 to be stored in the power storage apparatus 83.

Accordingly, if power is received from the renewable system 90, the power storage controller 81 may control the renewable system 90 to stop transmission of power from the renewable system 90 (S165).

More specifically, if power is received from the renewable system 90, the power storage controller 81 may request to stop transmission of power from the renewable system 90. The renewable controller 91 of the renewable system 90 may perform control not to transmit power generated by the renewable system 90 to the power storage system 80 or stop operation of the renewable energy source 93 not to generate power in response to the request.

Meanwhile, the power compensation controller 71 of the power compensation system 70 may monitor the frequency of the power system 30 to determine whether the active power of the power system 30 is absorbed such that the frequency of the power system 30 is within a stable range (S169).

The stable range may be ±1.67% to 3.4% of the commercial frequency of 60 Hz. That is, the stable range may be 58 Hz to 62 Hz. Preferably, the stable range may be 59 Hz to 60.5 Hz.

The frequency of the power system 30 is compared with the stable range, because 60 Hz, which is the commercial frequency used and defined in the power system 30, is not always constant. In the domestic Electricity Enterprises Act, the commercial frequency is set to 60 Hz±0.2 Hz. In order to maintain the commercial frequency, a power system performs control for correcting imbalance between power generation and consumption. However, the frequency may be changed due to imbalance between power generation and consumption and power failure may occur if the frequency is out of the stable range. The power compensation system 70 may be used as control unit and the control method thereof will be described below.

Upon determining that the frequency of the power system 30 is within the stable range, the power compensation controller 71 may perform control not to absorb the active power of the power system 30 (S171). That is, absorption of active power may be stopped.

To this end, the power compensation controller 71 may stop operation of the converter 75. As operation of the converter 75 stops, since the plural IGBT switches included in the converter 75 are not switched, the active power of the power system 30 is not stored in the capacitor 77 or the power storage apparatus 83. This may mean that absorption of the active power of the power system 30 is stopped.

According to the present embodiment, the capacitor 77 may be charged with the active power of the power system 30 and, when the capacitor 77 is fully charged, the active power of the power system 30 may be stored in the power storage apparatus 83 to continuously store the active power of the power system 30, thereby stably supplying power to the power system 30.

When the active power of the power system 30 is stored in the power storage apparatus 83, power may not be received from the renewable system 90, thereby reducing costs of generating power.

In addition, in the present embodiment, active power may be supplied to the power system 30 using the capacitor 77 or the power storage apparatus 83 in which the active power of the power system 30 is absorbed, such that power is not generated in at least one or more power sources 20 connected to the power system 30 or the amount of power generated in the power sources is reduced, thereby reducing costs of generating power.

Figure 11:
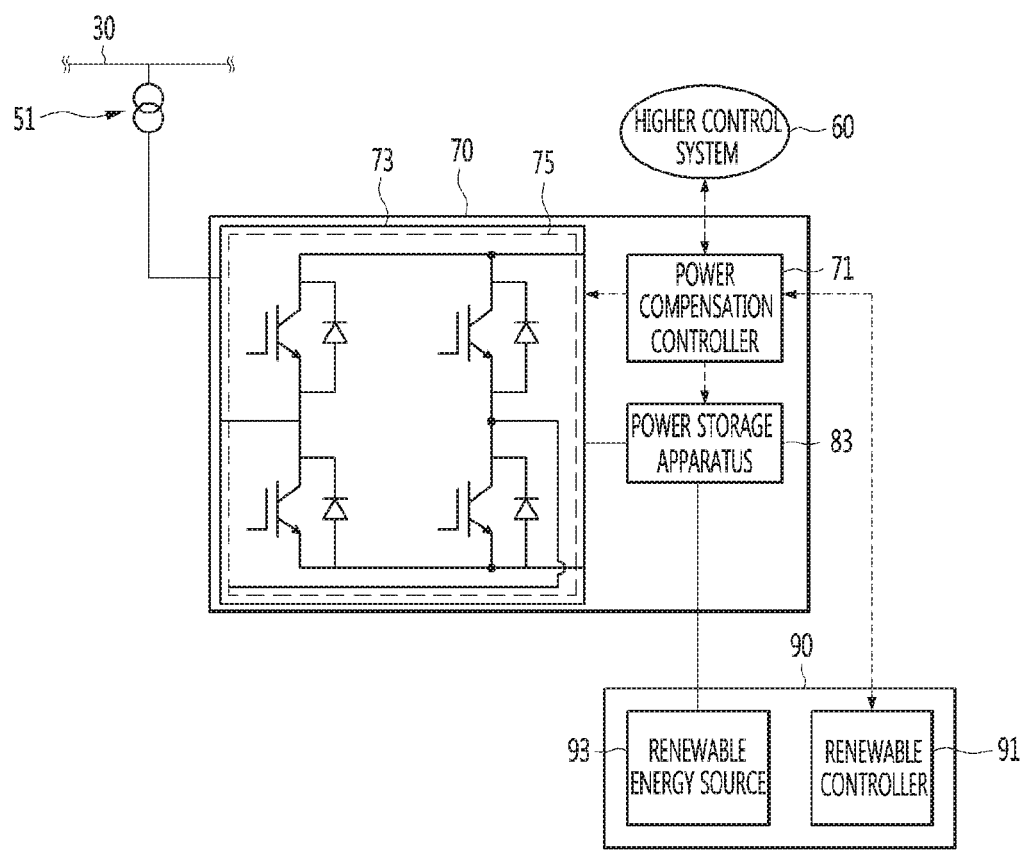
FIG. 11 is a block diagram showing a power compensation apparatus according to a third embodiment of the present disclosure.

FIG. 11 is a block diagram showing a power compensator according to a third embodiment.

The third embodiment is similar to the first and second embodiments except that the first to third switch elements 110, 112 and 114 and the capacitor 77 included in the power compensator 73 are removed.

The power compensator 73 may include only the converter 75. Accordingly, the input terminal of the converter 75 may be connected to the power system 30 through the transformer and the current transformer 51 and the output terminal of the converter 75 may be directly connected to the power storage apparatus 83.

In addition, the power compensation controller 71 may control both the converter 75 of the power compensator 73 and the power storage apparatus 83. In addition, the power compensation controller 71 may directly control the renewable system 90 to receive power from the renewable system 90 or to stop power transmission.

As a first example, the power compensation controller 71 may control the converter 75 based on the sensed voltage of the power system 30 to synchronize the phase of the current with the phase of the voltage, thereby exchanging reactive power with the power system 30.

For example, the power compensation controller 71 may compensate for reactive power of the power system 30 if the reactive power of the power system 30 is insufficient and absorb reactive power from the power system 30 if the amount of reactive power of power system 30 is excessive.

As a second example, the power compensation controller 71 may control the converter 75 based on the frequency of the power system to store the active power of the power system 30 or to supply active power to the power system.

For example, the power compensation controller 71 may supply the power stored in the power storage apparatus 83 to the power system 30 as active power if the active power of the power system 30 is insufficient. The power compensation controller 71 may control the renewable system 90 to receive power from the renewable system 90 and to store power in the power storage apparatus 83, if the amount of power stored in the power storage apparatus 83 is less than a set value.

As an example, power stored in the power storage apparatus 83 may be supplied to the power system 30 and, at the same time, power transmitted from the renewable system 90 may be stored in the power storage apparatus 83, without being limited thereto.

As another example, if active power is supplied to the power system 30, instead of power stored in the power storage apparatus 83, power generated by the renewable energy source 93 of the renewable system 90 may be directly supplied to the power system 30 through the converter 75, without being limited thereto.

The effects of the power compensation apparatus and the method of controlling the same according to the present disclosure will now be described.

According to at least one of the embodiments of the present disclosure, active power is supplied to the power system using power stored in the capacitor of the power compensation system (first system) and, when the power stored in the capacitor cannot be supplied to the power system, power stored in the power storage apparatus of the power storage system (second system) is supplied to the power system, thereby consistently supplying active power to the power system. Therefore, it is possible to stably supply power to the power system.

According to at least one of the embodiments of the present disclosure, the capacitor is charged with active power of the power system and, when the capacitor is fully charged, active power of the power system is stored in the power storage apparatus, thereby consistently storing active power of the power system. Therefore, it is possible to stably supply power to the power system.

In addition, in the present disclosure, when active power of the power system is stored in the power storage apparatus, power may not be received from the renewable system (third system). Therefore, it is possible to reduce loss occurring in a power conversion process.

In the present disclosure, since active power can always be supplied to the power system using the capacitor or the power storage apparatus in which active power of the power system is stored, power is not generated in at least one or more power sources connected to the power system or the amount of power generated in the power sources is reduced, thereby reducing costs of generating power.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A power compensation apparatus for compensating for power of a power system to be allowed to transmit from at least one or more power sources to a load, the power compensation apparatus comprising:
   a first system connected to the power system to compensate for active power and reactive power of the power system;
   a second system connected to the first system to store power necessary for compensating for active power and reactive power; and
   a third system connected to the second system to generate power to be stored in the second system,
   wherein the first system includes:
   a converter connected to the power system to convert power;
   a capacitor connected to the converter and charged with active power of the power system or the power of the second system; and
   a first controller configured to control the converter and the capacitor.

2. The power compensation apparatus according to claim 1, wherein the first system further includes:
   a first switch element between the converter and the capacitor;
   a second switch element between the capacitor and the second system; and
   a third switch element between the converter and the second system.

3. The power compensation apparatus according to claim 1, wherein the second system includes:
   a power storage apparatus configured to store active power of the power system or the power generated by the third system; and
   a second controller configured to perform data communication with the first system and to control the power storage apparatus.

4. The power compensation apparatus according to claim 3, wherein the third system includes a renewable energy source configured to generate power to be transmitted to the second system.

5. The power compensation apparatus according to claim 4, wherein the first controller:
   determines whether reactive power is compensated for based on a voltage of the power system, and
   controls the converter to supply reactive power to the power system or to absorb reactive power from the power system.

6. The power compensation apparatus according to claim 4, wherein the first controller checks a charge amount of the capacitor and charges the capacitor with power stored in the power storage apparatus if the charge amount of the capacitor is insufficient.

7. The power compensation apparatus according to claim 4, wherein the first controller:
   determines whether active power and reactive power are compensated for based on a frequency of the power system, and
   controls the converter to supply active power and reactive power to the power system or to absorb active power and reactive power from the power system.

8. The power compensation apparatus according to claim 7, wherein the first controller controls the converter to supply power stored in the capacitor as active power to the power system when active power is supplied.

9. The power compensation apparatus according to claim 8, wherein the first controller controls the second system to supply power stored in the power storage apparatus as active power to the power system, if the charge amount of the capacitor is insufficient.

10. The power compensation apparatus according to claim 9, wherein the second controller controls the third system to receive power generated by the renewable energy source and to store the received power in the power storage apparatus, if the amount of power stored in the power storage apparatus is insufficient.

11. The power compensation apparatus according to claim 7, wherein the first controller controls the converter to charge the capacitor with active power of the power system, when active power is absorbed.

12. The power compensation apparatus according to claim 11, wherein the first controller controls the second system to store active power of the power system in the power storage apparatus, if the capacitor is fully charged.

13. The power compensation apparatus according to claim 12, wherein the second controller controls the third system such that the third system does not transmit power, if the third system transmits power.

14. The power compensation apparatus according to claim 12, wherein the first controller performs control to stop absorption of active power of the power system if the frequency of the power system is within a stable range.

15. A power compensation apparatus for compensating for power of a power system to be allowed to transmit from at least one or more power sources to a load, the power compensation apparatus comprising:
   a first system connected to the power system to compensate for active power and reactive power of the power system and to store power necessary for compensating for active power and reactive power; and
   a second system connected to the first system to generate power to be stored in the first system,
   wherein the first system includes:
   a converter connected to the power system to convert power;
   a power storage apparatus connected to the converter to store active power of the power system or the power generated by the second system; and
   a controller configured to control the converter and the power storage apparatus.

16. A method of controlling a power compensation apparatus including a first system including a converter and a capacitor, a second system including a power storage apparatus and a third system including at least one or more renewable energy sources, in order to compensate for power of a power system to be allowed to transmit from at least one or more power sources to a load, the method comprising:
- measuring, by the first system, a voltage and frequency of the power system;
- determining, by the first system, one of a reactive power supply mode, a reactive power absorption mode, an active power supply mode and an active power absorption mode based on the voltage and frequency;
- compensating for, by the first system, power according to the determined mode; and
- storing, by the second system, power generated by the at least one or more renewable energy sources in the power storage apparatus.

17. The method according to claim 16, further comprising controlling, by the first system, the second system to receive the power from the power storage apparatus and to charge the received power on the capacitor of the first system if the capacitor of the first system is not charged upon initial operation of the first system.

18. The method according to claim 16, further comprising controlling, by the first system, the converter of the first system to supply active power to the power system or to absorb reactive power of the power system in the reactive power supply mode or the reactive power absorption mode.

19. The method according to claim 16, further comprising:
- supplying, by the first system, the power stored in the capacitor of the first system to the power system as active power in the active power supply mode; and
- controlling, by the first system, the second system to supply the power stored in the power storage apparatus to the power system as active power if a charge amount of the capacitor of the first system is insufficient.

20. The method according to claim 19, further comprising controlling, by the second system, the third system to receive power generated by the renewable energy sources and to store the received power in the power storage apparatus if the amount of power stored in the power storage apparatus of the second system is insufficient.

21. The method according to claim 16, further comprising:
- charging, by the first system, the capacitor of the first system with the active power of the power system in the active power absorption mode; and
- controlling, by the first system, the second system to store the active power of the power system in the power storage apparatus if the capacitor of the first system is fully charged.

22. The method according to claim 21, further comprising the second system controlling, by the second system, the third system to stop transmission of power from the third system if the third system transmits power.

* * * * *